(12) United States Patent
Jourdain et al.

(10) Patent No.: US 7,545,749 B2
(45) Date of Patent: Jun. 9, 2009

(54) HIGH-ACCURACY PACKET PAIR FOR NETWORK BOTTLENECK BANDWIDTH MEASUREMENT

(75) Inventors: Mathias Jourdain, Seattle, WA (US); Joel L. Rosenberger, Fall City, WA (US); Khawar M. Zuberi, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 579 days.

(21) Appl. No.: 11/058,847

(22) Filed: Feb. 15, 2005

(65) Prior Publication Data

US 2006/0182039 A1 Aug. 17, 2006

(51) Int. Cl.
 *G01R 31/08* (2006.01)
(52) U.S. Cl. ............... 370/235; 370/248; 370/252; 370/445
(58) Field of Classification Search .......... 370/507, 370/503, 235, 389, 252, 468, 248, 445; 710/260; 709/248, 223, 224
See application file for complete search history.

(56) References Cited

U.S. PATENT DOCUMENTS

| | | | | |
|---|---|---|---|---|
| 6,118,787 A * | 9/2000 | Kalkunte et al. | ............ | 370/445 |
| 6,216,163 B1 * | 4/2001 | Bharali et al. | ............ | 709/227 |
| 6,430,160 B1 * | 8/2002 | Smith et al. | ............ | 370/252 |
| 6,557,035 B1 * | 4/2003 | McKnight | ............ | 709/224 |
| 6,658,025 B2 * | 12/2003 | Mauritz et al. | ............ | 370/507 |
| 6,741,568 B1 * | 5/2004 | Barillaud | ............ | 370/252 |
| 6,850,541 B2 * | 2/2005 | Gross | ............ | 370/473 |
| 6,868,466 B2 * | 3/2005 | Connor | ............ | 710/260 |
| 6,922,417 B2 * | 7/2005 | Vanlint | ............ | 370/503 |
| 6,977,895 B1 * | 12/2005 | Shi et al. | ............ | 370/235 |
| 7,000,031 B2 * | 2/2006 | Fischer et al. | ............ | 709/248 |
| 7,061,866 B2 * | 6/2006 | Connor | ............ | 370/235 |
| 7,095,737 B2 * | 8/2006 | Lo | ............ | 370/389 |
| 7,180,858 B1 * | 2/2007 | Roy et al. | ............ | 370/232 |
| 7,239,611 B2 * | 7/2007 | Khisti et al. | ............ | 370/230 |
| 7,349,977 B2 * | 3/2008 | Brown et al. | ............ | 709/235 |
| 2001/0050903 A1 * | 12/2001 | Vanlint | ............ | 370/252 |
| 2002/0169880 A1 * | 11/2002 | Loguinov et al. | ............ | 709/228 |
| 2002/0186660 A1 * | 12/2002 | Bahadiroglu | ............ | 370/248 |
| 2004/0001511 A1 * | 1/2004 | Matta | ............ | 370/468 |

(Continued)

OTHER PUBLICATIONS

Lai et al.; "Measuring Link Bandwidths Using a Deterministic Model of Packet Delay";2002; Department of Computer Science, Stanfors University ; p. 1-12.*

(Continued)

*Primary Examiner*—Ricky Ngo
*Assistant Examiner*—Dewanda Samuel
(74) *Attorney, Agent, or Firm*—Wolf, Greenfield & Sacks, P.C.

(57) ABSTRACT

A novel packet filtering and processing mechanism solves bandwidth estimation problems related to cross-traffic, host limitations, and fabric-specific issues in order to accurately estimate bottleneck bandwidth in fluctuating environments such as home networks. In particular, the process controls the number of packet train experiments, the size of trains and packets within trains, and other factors to eliminate errors due to cross-traffic, network capture, receiver CPU overload, interrupt moderation, and other networking factors. In an embodiment of the invention, a history window is applied to estimates derived from individual trains to ensure that data used to make a bottleneck bandwidth estimate was taken at a time when the network is relatively stable.

19 Claims, 11 Drawing Sheets

U.S. PATENT DOCUMENTS

2005/0111487 A1* 5/2005 Matta et al. .................. 370/468
2005/0114487 A1* 5/2005 Peng et al. .................. 709/223

OTHER PUBLICATIONS

Paxson, Vern, "*End-to-End Internet Packet Dynamics*", IEEE/ACM *Transactions on Networking*, vol. 7, No. 3, Jun. 1999, 14 pages.
Pasztor, Attila, et al., "*The Packet Size Dependence of Packet Pair Like Methods*", Tenth IEEE International Workshop on Quality of Service, 2002, 13 pages.
Pasztor, Attila, et al., "*A Precision Infrastructure for Active Probing*" Proceedings of the PAM, Workshop on Passive and Active Networking, 2001.
Thomson, K., et al., "*Wide-area Internet Traffic Patterns and Characteristics*", IEEE Network, vol. 11, No. 6, 1997, pp. 10-23.
Devrolis, Constantinos, et al., "*What do Packet Dispersion Techniques Measure*", Infocom, vol. 2, IEEE, 2001, pp. 905-914.
Lai, Kevin, et al., "*Measuring Bandwidth*", Proceedings of IEEE Infocom '99, 1999.

\* cited by examiner

HIGH-ACCURACY PACKET PAIR FOR NETWORK BOTTLENECK BANDWIDTH MEASUREMENT

FIELD OF THE INVENTION

This invention pertains generally to computer network communications and, more particularly, to measurement of bottleneck bandwidth in a communications path in a computer network.

BACKGROUND OF THE INVENTION

Computers and computing devices are becoming more deeply integrated into home and work environments with each passing day. A large portion of the utilization in such environments, especially the home environment, is entertainment oriented. Such use tends to involve large amounts of audio and/or video data. In addition, the home and office environments are becoming increasingly networked. For example, a home personal computer (PC) may be linked, wired or wirelessly, to a home media center, a communications center, and/or other home systems or devices. When such an environment is utilized for entertainment purposes, large amounts of video and/or audio data must typically be transmitted over one or more links of the home network. For example, the entertainment data may be sent from a PC to a media center.

In order to send the best quality data that the network will support, i.e., to assure adequate quality of service (QoS), it is important to be able to determine the bandwidth that is available. In order to determine this, one must identify the bottleneck bandwidth on the network. The term "bottleneck bandwidth" refers to the bandwidth at a point in the network that at a given moment is providing the least amount of bandwidth in the network path. Thus, while most of the network may support a data rate of x kbps, the bottleneck may allow only x/2 kbps. Data sent over a network path including the bottleneck would thus be limited to x/2 kbps.

Techniques have been devised in the past to try to ascertain the bottleneck bandwidth. A technique often referred to as the "packet pair" technique was devised to find bottleneck bandwidth on large networks such as the Internet. This technique involves sending two closely spaced packets sequentially and evaluating the inter-packet timing at the recipient. However, this technique as previously implemented is not well-suited for home networks and the like due to the heavy variations and fluctuations in network conditions in such environments.

Moreover, some packet pair schemes are completely sender based. They force the receiver to send response packets (e.g. ICMP reply or ICMP unreachable) and measure the inter-packet delay between these. This approach assumes many, i.e., that both directions of the path display the same bottleneck bandwidth and the same network conditions. In fact, however, certain connections, such as DSL connections, often have asymmetric bandwidths.

A simple and effective system of bottleneck bandwidth determination is needed to solve these shortcomings and others inherent in prior systems of network bandwidth estimation.

BRIEF SUMMARY OF THE INVENTION

Embodiments of the invention solve the shortcomings inherent in prior techniques by employing a novel technique of packet train transmission, and of filtering and processing intra packet train and inter packet train delay information to derive an accurate estimate of bottleneck bandwidth along an analyzed network path.

The described embodiment of the invention solves problems related to cross-traffic, host limitations, and fabric-specific issues to accurately estimate bottleneck bandwidth in fluctuating environments such as home networks. The novel filtering and processing approach controls the number of packet train experiments, the size of trains and packets within trains, and other factors to eliminate errors due to cross-traffic, network capture, receiver CPU overload, interrupt moderation, and other networking factors. In an embodiment of the invention, a history window is applied to estimates derived from individual trains to ensure that data used to make a bottleneck bandwidth estimate is taken at a time when the network is relatively stable.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the invention with particularity, the invention and its advantages are best understood from the following detailed description taken in conjunction with the accompanying drawings, of which:

FIG. 6 is a bar graph showing inter-packet delays for 3 trains of 16 packets of 1500 bytes each sent over 802.11a;

DETAILED DESCRIPTION OF THE INVENTION

As will be described in greater detail below, embodiments of the invention combine one or more of a number of techniques usable to overcome the shortcomings of the traditional packet pair implementation. This improvement allows for the accurate estimation of bottleneck bandwidth within highly variable networking environments such as home networks, thus enabling the most efficient bandwidth usage.

The following publications may be of use to the reader in understanding the background of the invention, and each such publication is herein incorporated by reference for all that it discloses, teaches, references, or incorporates without exclusion of any portion thereof. Vern Paxson, "*End-to-End Internet Packet Dynamics*", IEEE/ACM Transactions on Networking, Vol. 7, No. 3, June 1999; Attila Pásztor and Darryl Veitch, "*The Packet Size Dependence of Packet Pair Like Methods*", Tenth IEEE International Workshop on Quality of Service, 204-213, 2002; Attila Pásztor and Darryl Veitch, "*A Precision Infrastructure for Active Probing*", Proceedings of the PAM, Workshop on Passive and Active Networking, 2001; K. Thomson, G. J. Miller and R. Wilder, "*Wide-area Internet traffic patterns and characteristics*", IEEE Network, Vol. 10, No. 6, 11-23, 1997; Constantinos Devrolis, Parameswaran Ramanathan and David Moore, "*What do packet dispersion techniques measure?*", Infocom, Volume 2, 905-914, IEEE, 2001; and Kevin Lai and Mary Baker, "*Measuring Bandwidth*", Proceedings of IEEE Infocom '99, 1999.

The bottleneck bandwidth of a path is sometimes alternatively referred to as the bottleneck capacity. The bottleneck bandwidth can be contrasted with the available bandwidth, which is the remaining throughput available on the same network path at a specific instant of time. The available bandwidth defined in this manner can never exceed the bottleneck bandwidth, i.e., the greatest bandwidth that can be available is the bottleneck bandwidth. However, the bottleneck bandwidth often changes over time. For example, on an 802.11 wireless link, many factors can interact to interfere with the carrier frequency such that the link capacity constantly fluctuates.

Figure 1:
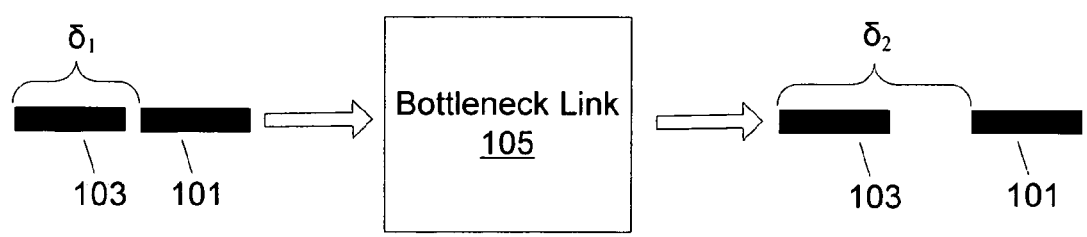
FIG. 1 is a schematic illustration of a packet pair experiment, showing packet delay dilation due to a bottleneck in the network path.

In the packet pair technique as previously implemented, illustrated schematically in FIG. 1, two packets 101, 103 of equal size are sent back-to-back (or as closely spaced as possible) to the same destination. The intrapacket spacing is initially $\delta_1$. In a switched network, the packets will follow one another until they leave the bottleneck link 105. At this point, the first packet 101 speeds away while the second 103 is still being processed. If the packets are of size b bytes and the bottleneck 105 bandwidth is of magnitude B bytes/s, then $\delta_2$=b/B is the servicing time in seconds at the bottleneck 105.

If the second packet 103 arrives at the bottleneck link 105 less than $\delta_2$ time after the first packet 101, the second packet 103 will leave the bottleneck link 105 $\delta_2$ time after the first packet 101. Moreover, the second packet 103 will not be able to catch up to the first packet 101 unless the first packet 101 is delayed. We can calculate B by measuring, at the receiver, the inter-packet timing $\Delta$. That is, under ideal network conditions $\Delta=\delta_2$. In order to calculate B (bottleneck bandwidth) from $\Delta$ (inter-packet timing) then, the equation B=b/$\Delta$ can be used.

However, in a highly variable environment such as a home network, several factors can affect the measurement of the intrapacket spacing. These factors will typically impact the measurements to the point that they cannot be used to derive a sufficiently accurate estimation of the bottleneck bandwidth. For the reader's convenience, a number of these factors are discussed below, after which certain solutions according to various embodiments of the invention are discussed.

Modern home networks sometimes employ receivers with limited central processing unit (CPU) capabilities, i.e., these hosts have a CPU that is sometimes incapable of processing network traffic at the incoming line rate. In such a situation, the effective bottleneck bandwidth of a path is not determined by the bandwidth of the bottleneck link but by the receiver itself. Home networks and other small networks which will benefit from various embodiments of the invention include generally networks wherein (1) there are few hops on the single path between the source and the sink, (2) there is small set of possible networking technologies, (3) there is a bottleneck bandwidth, measured in mbps, which may have quick and drastic fluctuations (most notably on 802.11), and (4) cross-traffic and other interference cannot easily be mathematically characterized or precisely predicted.

As discussed, there are many factors that can influence the measurements of packet pair spacing. The first complication that we will discuss is referred to as "dilation." Dilation occurs when the second packet is delayed. For example, cross-traffic may be interspaced between the two packets. This can occur before the bottleneck link (e.g., where the first packet is already gone when the second packet arrives) or after the bottleneck link. As a result of this complication, $\Delta>>\delta_2$, and B is accordingly underestimated.

Another complicating factor is referred to as "compression." Compression occurs when the first packet is delayed after the bottleneck link. The second packet thus catches up with the first packet after the bottleneck. For example, cross-traffic may create a queuing delay before the first packet. Compression is only a concern after the bottleneck link. The undesired result of compression is that $\Delta<<\delta_2$, and B is accordingly overestimated.

The variability of cross traffic is another significant source of complication in accurately measuring $\delta_2$. Studies show that the bottleneck bandwidth estimates from a large set of identical packet pairs do not group around one estimate but multiple ones: the distribution of estimates has multiple local maxima. These are referred to as modes and the distribution is called multi-modal (e.g., in contrast to a unimodal distribution). Cross-traffic is the cause of these anomalies. Cross-traffic packets of various sizes affect packet pairs of fixed size differently. If the distribution of cross-traffic itself has multiple modes, this is reflected in the distribution of bottleneck bandwidth estimates.

Typically, analysis of traffic on the Internet has grouped packet sizes in buckets: 50% at 40 bytes, 20% at ~576 bytes, 15% at 1500 bytes and 15% for various sizes. Each home network may similarly have its own distribution of packet sizes. Only those packet pair experiments not affected by cross-traffic can be used to estimate the true bottleneck bandwidth.

Thus, a primary problem to be overcome in using the packet pair technique lies in properly filtering the results. Identifying the modes created by noise is not trivial. Most research uses histograms which Lai and Baker criticize in "Measuring Bandwidth," Proceedings of IEEE Infocom '99, 1999 (Kevin Lai and Mary Baker) by the following: "Unfortunately, there are several problems with histograms. One problem is that bin widths are fixed, and it is difficult to choose an appropriate bin width without previously knowing something about the distribution. Another problem is that bin boundaries do not respect the distribution. Two points could lie very close to each other on either side of a bin boundary and the bin boundary ignores that relationship. Finally, a histogram will report the same density for points with the same value as points which are in the bin, but at opposite ends of the bin."

This is confirmed by the heuristic suggested by Devrolis, Ramanathan and Moore in "What do packet dispersion techniques measure?," Infocom, Volume 2, 905-914, IEEE, 2001. The authors adjust the bin width according to the guessed bottleneck bandwidth. For example, for B<1 Mbps they use 10%, 7.5% for B≈10 Mbps, and 2% for B≈150 Mbps. Lai and Baker suggest instead using a kernel density estimator which abstracts the fixed bins of a histogram. They do not however discuss the mechanism by which they chose the width of the kernel density estimator.

Another complicating factor is related to receiver clock resolution or granularity. In particular, the receiver must be able to determine the space between the two packets it receives. On one available system the system clock has a granularity of 10 ms or 15.6 ms. Assuming packets of size b=1500 bytes (including the layer-3 header), this clock cannot be used to measure speeds above 1500B/0.01 s≈150 KB/s.

Another issue in attempting to use the packet pair spacing to estimate bottleneck bandwidth is the setting of the initial inter-packet space. For example, suppose a path with a bottleneck bandwidth B=100 Mbps. If the size of packet pair packets, including the headers, is b=1500 bytes, then the inter-packet space after the bottleneck link will be δ=1500/(100×1024×1024/8)≈0.1 ms. On 802.11b, the inter-packet space for B≈6 Mbps is δ=1500/(6×1024×1024/8)≈2 ms. Thus, the source host must be able to send the second packet at a time less than 0.1 ms (or 2 ms) after the first one. Otherwise, the second packet will not catch up to the first one at the bottleneck link and the source itself becomes the bottleneck link.

Stack and host overhead create further problems in accurately estimating bottleneck bandwidth. Again, suppose a path with a bottleneck bandwidth B=100 Mbps and packet pair packets of size b=1500 bytes, including the headers. In this case, the inter-packet space after the bottleneck link will be δ=1500/(100×1024×1024/8)≈0.1 ms. Specifically, there will be a gap of ~0.1 ms between the last bit of the first packet and the last bit of the second packet.

Note that it is impractical to time stamp packets at the NIC. This is because NICs as well as operating system networking stacks are typically not designed to timestamp at the hardware level. Moreover, time stamping inside the NIC's driver would impose a substantial cost on the operating system. Since we cannot timestamp at the NIC, there will be an added cost as the packet goes up the stack. Ideally, the stack's overhead is either (1) negligible when compared to the inter-packet delay or (2) constant such that the processing time between reception of a packet at the NIC and its time stamping at a higher layer does not fluctuate. In reality, multiple difficulties can occur to disrupt the stack's processing. For example, a context switch adds a significant amount of noise to the estimate. On a host with limited memory, the timestamping module might be paged out to disk. The cost to page it in will outweigh the measured inter-packet delay rendering the measurement meaningless.

One significant problem in employing the packet pair technique is caused by interrupt moderation. An "interrupt" is a signal that typically results in a context switch so that the processor momentarily ceases its current task and does another task. Ordinarily, receipt of a packet could cause an interrupt so that the processing of the packet may be attended to. However, interrupt moderation allows a network interface card (NIC) to group multiple interrupt events in one. While this certainly lightens the load on the CPU, all packets are now seen to have arrived at the same time from the perspective of the timestamping module. Interrupt moderation scheme are usually a combination of multiple limits: (1) how long the first packet can be delayed after it is received by the NIC; (2) how long to wait between packets; and (3) how many packets the NIC can hold in its receive buffers.

In addition to the issues mentioned above, a number of fabric specific issues also affect the use of packet pair techniques for estimation of bottleneck bandwidth. For example, the size of layer-2 headers of the bottleneck link must be taken into account to accurately measure the bottleneck bandwidth. On Ethernet, the header is 14 bytes and the trailing CRC is 4 bytes. Moreover, 802.1Q tags add a minimum of 4 bytes. Both are different for SNAP. On 802.11, the header size is 30 bytes, CRC is still 4 bytes and the EDCF specific field is 2 bytes. Ignoring the layer-2 header on 802.11 underestimates by 1-b/(b-34) where b is the packet size. For b=1500, this is ~2.2% and for b=500, this is ~6.4%.

With multichannel fabrics, a link can forward multiple packets in parallel (limited by its number of channels). Therefore, although an ISDN link may have a capacity of 128 Kb/s, the packets of the packet pair may each go out on a different channel simultaneously. Therefore no network delay has been introduced. Multilink breaks packet pair's assumption that there is a single queue in the network. However, none of the current home networking technologies use multiple channels.

A more generalized issue to consider is that packet pair techniques assume that the packets of the pair follow one another on the same path and that the network equipment employs first in first out (FIFO) routing. However, this is not always the case; out-of-order delivery can occur for multiple reasons including load-balancing, route changes, etc.

Packet replication will also impact the usefulness of packet pair techniques. If a layer-2 device is defective or not configured properly, it may replicate multiple times the same packet on the forwarding path. This tends to dilate the δ measurement.

Packet corruption (or packet loss) is a further problem that may void one or more packet pair experiments. Although the UDP packet header includes a checksum of itself and the user data in the packet, using this mechanism increases the CPU overhead on the sender. Instead, in an embodiment of the invention the sink itself validates that the layer-3 header is appropriate. Since packet spacing is the only concern, corruption in the payload is not an issue.

Other problems with using prior packet pair techniques in highly variable networks are caused by a CPU bound sink or receiver. In particular, as noted above in summary, when a sink has limited CPU capabilities, the bottleneck bandwidth is bounded by the recipient's ability to process received packets. For example, although the path could have a bottleneck bandwidth of B=100 Mb, the sink may only be capable of processing 34 Mb of UDP traffic. This raises two problems: (1) if the sink is unable to timestamp packets arriving at line rate, it is not possible to consistently measure the true bottleneck bandwidth of a path, and (2) if bottleneck bandwidth is to be used as a starting point for further network testing between the two hosts, then the sink's limitation must be taken into account. It should be noted that the maximum sustainable throughput which the sink can process will largely be determined by both the protocol used and the size of packets used. For example, given their different overhead, maximum achievable throughput will be different for UDP and TCP.

A further complication is the highly variable bandwidth in home networks and other similar environments. As mentioned above, newer fabrics such as no-new wire solutions (including 802.11) have a non-constant bandwidth. Multiple external factors can interfere with the carrier frequency. For example, electronic devices and objects moving in and out of the direct path (or causing radio waves to reverberate and create a multi-path problem) are factors that can corrupt transmissions. If the error rate increases beyond a threshold, hosts will change the layer-2 encoding for packets to improve error-correction. As a result, capacity diminishes. It is quite possible that a series of packet pair experiments over a 250 ms period will straddle one or more rate changes. Note that these changes may be undetectable from compression or dilation due to cross-traffic. Moreover, the frequency of the fluctuations may be unknown to both sides.

The "network capture effect" can also render useless traditional packet pair testing. The network capture effect is a well known phenomenon in Ethernet networks. As multiple hosts contend for a saturated network fabric, the number of collisions increases. As these cross a threshold, and with the exponential backoff delays that are mandated by the protocol, all hosts except one may find themselves in the backed off state. While the contention mechanism is ordinarily reasonably fair, in the network capture situation described above, one host can now unfairly transmit multiple packets without competition.

Although the technology is different, the same phenomenon can occur within 802.11 fabrics. However, since the time to acquire the media is a significant part of the transmission time, this impacts the instantaneous bandwidth. For example, using packet pair, if the host sending the traffic holds the media through both sends, the inter-packet gap $\delta$ experienced will be smaller than on average, yielding a better than expected bottleneck bandwidth estimate. Conversely, if the host loses the fabric between the first and second packet and backs off exponentially, the gap $\delta$ will be much bigger than expected, yielding a similarly inaccurate bottleneck bandwidth estimate.

Our experiments show that while the average throughput on an 802.11a network may be between 24 Mbps and 28 Mbps, a packet pair sent while the host held the fabric without contention could experience throughput of ~35 Mbps. Naturally, estimated throughput is negligible if the second packet is delayed by the network capture effect.

A number of difficulties affecting the typical packet pair testing approach have been described above. In the following discussion, solutions according to various embodiments of the invention are described, including, inter alia, a mechanism to detect interrupt moderation as well as to detect the network capture effect. The solutions involve in many cases sending a train of packets with particular configurations and/or with particular processing. It should be understood that in order to avoid impacting real network traffic, packet trains should be spaced out to allow existing traffic to absorb the impact. In contrast, since bottleneck bandwidth measurements are often in scenarios involving a human user, the testing should be completed as quickly and efficiently as possible, preferably although not necessarily in less than 250 ms.

As discussed above, individual packet pairs are susceptible to transient network problems. A meaningful estimate therefore cannot be given with only one packet pair test. Ideally, one would look at 2000 to 5000 samples to build a distribution. However, note that for b=1500 bytes, 2000 samples is significant traffic (e.g. 24 Mbps) which either impacts the fabric or is done over a longer period of time. Therefore, the use of such a large number of samples is impractical.

Small back-to-back packets present a lower exposure to interspersed cross-traffic than larger packets. These, typically being of MTU size, have a larger dispersion which is easier to measure and more robust to queuing delay noise after the bottleneck link. Moreover, as mentioned previously, the compression and dilation effects of cross-traffic packets is different for various packet sizes. However all sizes of packets are affected similarly by the bottleneck link; with no cross-traffic and perfect time measurements, packets of size b=40 bytes give the same bottleneck bandwidth estimate as those of b=1500 bytes.

According to an embodiment of the invention, the use of various packet sizes for the packet trains allows one to filter out the multiple modes of cross-traffic leaving only the true bottleneck bandwidth. Our experiments show that, for a home network, using samples of size 900 bytes, 1200 and 1500 bytes gave the most stable results.

Packet trains (i.e. packet sequences of a large number of trains, i.e. three or more, e.g. 16) are used as well in various embodiments of the invention to smooth out transient noise. In particular, a large number N of packets of size b is sent back-to-back in an embodiment of the invention. The sink measures the total dispersion from the first packet to the last packet of the train and calculates the bandwidth as $B_N=(N-1)\times b/\Delta_N$. If there is no noise, $B_N$ will equal that given by a simple packet pair.

It is easier to measure the time gap between the first packet and the last of a group of packets than between 2 adjoining packets. This overcomes problems due to the host clock granularity. If a multichannel link has n channels, sending n+1 packets will force the last packet to be queued. If the receiving NIC does interrupt moderation, sending enough packets will force the device to generate more than 1 interrupt to let the host process the received data. The same holds for interrupt avoidance scheme. Nevertheless, the timestamp on the first packet is delayed. Finally, if the receiving stack has variable processing time, such as a cold start or changing the state of the antenna, packet trains allow one to smooth this variability. Our experiments showed that on a home network with cross-traffic, even large trains of 16 packets can be used to measure the bottleneck bandwidth.

As discussed, packet trains can be used to smooth out variance in the receiving stack. According to an embodiment of the invention, each train is preceded by an additional packet. This addresses the cold start problem by insuring that every element of the path is ready to receive the train. Although this additional packet follows the same code paths as the experiment's packets at the sink, its data is discarded. As noted, high-accuracy packet time stamping is desirable. However, instead of using kernel mode low level time stamping, in an embodiment of the invention the system prioritizes the time stamping thread and minimizes context switches. Of course, any suitable time stamping method, including kernel mode low level time stamping, may be used in keeping with the invention depending upon design preferences and environmental parameters.

As discussed above, a CPU bound sink can render packet timing experiments of little use. In an embodiment of the invention, this difficulty is overcome in a manner that will be described below. Assume a scenario where the source can send packets fast enough and the sink has no hardware limitations impacting the measurements. The only impact on the inter-packet delay comes from the network. The transmission time $\delta$ for a packet crossing the bottleneck link has two parts: a fixed per-packet delay (e.g. media acquisition time) and a variable delay proportional to the packet's size.

Figure 2:
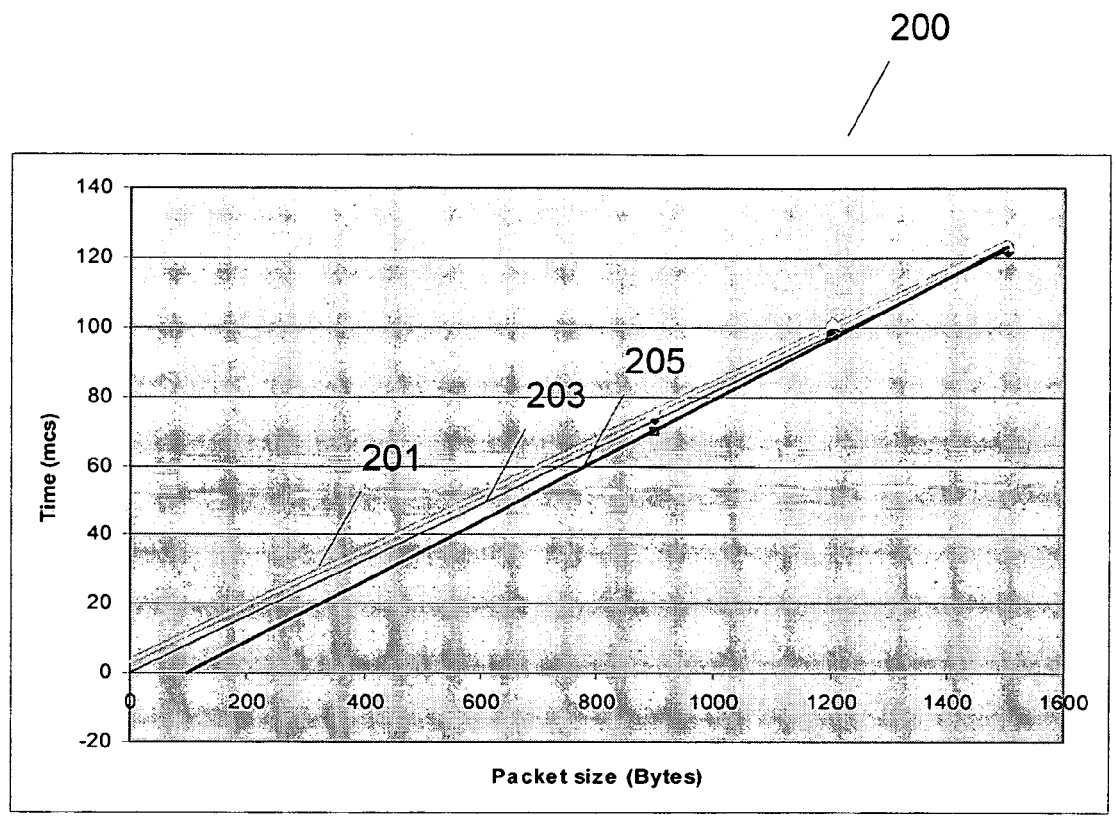
FIG. 2 is a data plot of packet delay versus packet size showing that delay δ between packets is strongly correlated with the packet size in a switched 100 Mb link, such that the fixed delay is negligible.

For example, on a switched 100 Mb link, $\delta$ is so strongly correlated with the packet size that the fixed delay is negligible. FIG. 2 shows experimental measurements 200 of this. It can be seen that the three sets of data 201, 203, 205 are very similar and indicate very little fixed delay. A similar pattern occurs on wireless networks as shown by the three sets of data 301, 303, 305, of plot 300 in FIG. 3.

Now consider the same scenario but with a CPU bound sink; it cannot process an incoming packet before another arrives. Thus, the per-packet computation time at the sink outweighs the per-packet transmission time at the path's bottleneck. For example, the measured delay between two 1500 byte packets arriving at line speed could be ~370 microseconds (mcs). From FIG. 2 we know this would be ~120 mcs if the sink was not CPU bound. The interpacket delay also has two parts: a fixed per-packet delay (e.g. computations from the hardware interrupt, the NDIS and IP modules, kernel mode to user mode transitions) and a variable delay proportional to the packet's size (e.g. the memory copy from the receiver buffer to the application's buffer).

Figure 3:
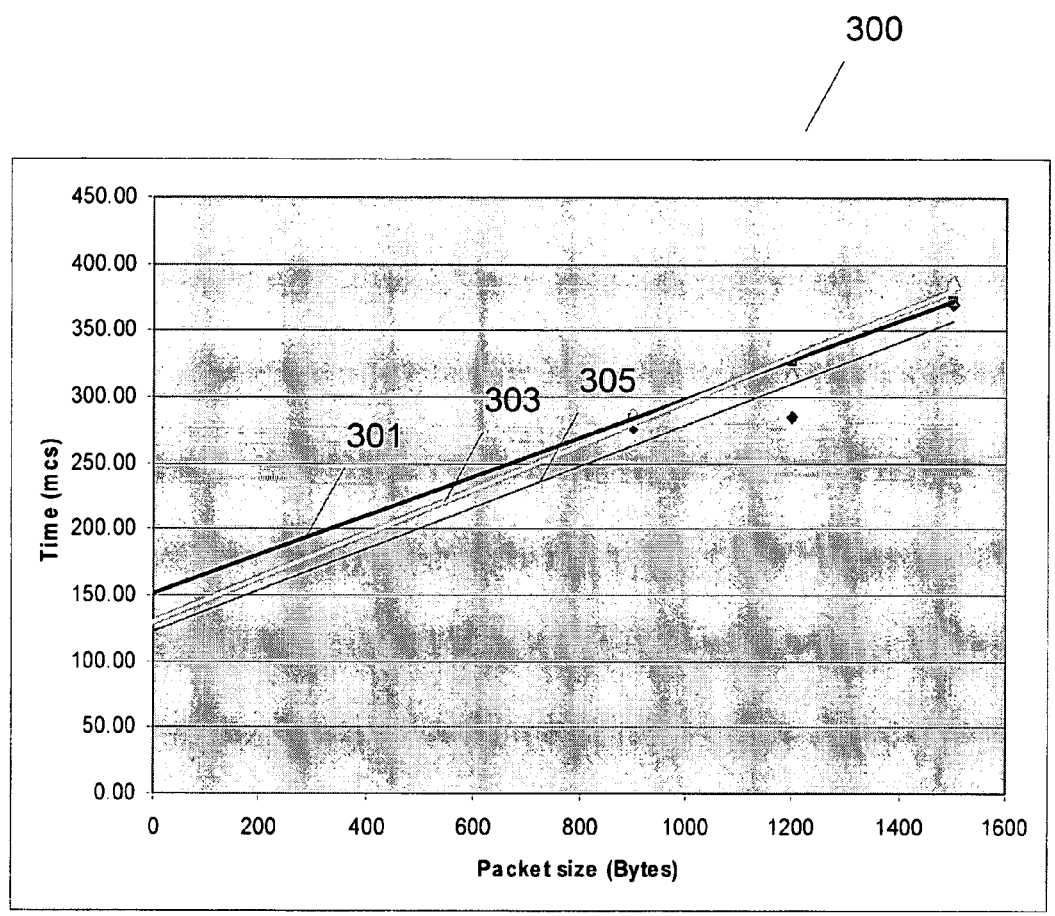
FIG. 3 is a data plot of packet delay versus packet size showing that delay δ between packets is strongly correlated with the packet size in a wireless network.
Figure 4:
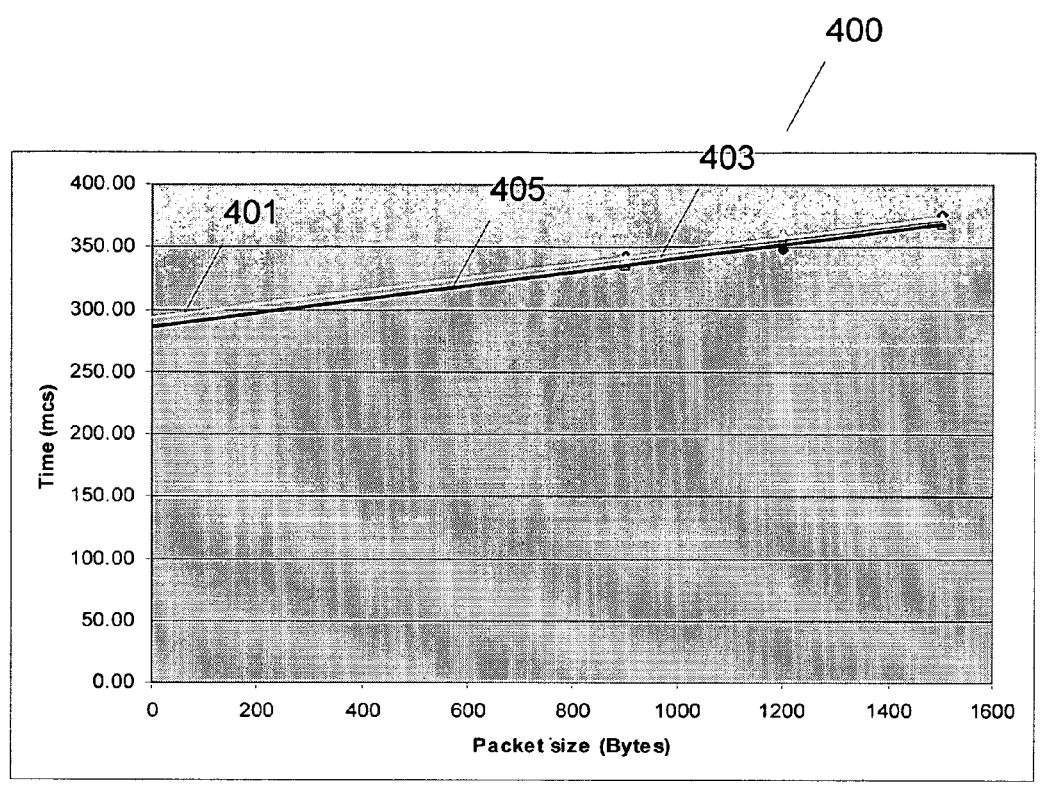
FIG. 4 is a data plot of packet delay versus packet size taken with respect to a CPU bound host, wherein the fixed delay introduced by the CPU bound host is overshadowing the delay introduced by the packet's size.

We have found that on a CPU bound host the proportional cost (e.g. the memory copy) is negligible compared to the fixed per-packet cost. FIG. 4 shows experimental results taken on such a bound host. In particular, plot 400 shows data curves 401, 403, 405. Lines 403 and 405 are so close as to be almost indistinguishable. It can be seen that the slope of the lines, i.e., the change in delay with respect to packet size, is very small. On a CPU bound host, for a packet of 1500 bytes, ~270 mcs of the ~370 mcs are independent of the packet size. While the exact values depend on the host's hardware, our experiments showed that for a CPU bound host receiving a packet of max MTU size, 70~80% of the processing time is independent of the packet size. If the host is not CPU bound, we find ~0% for 100 Mb switched Ethernet and up to 30~40% for a wireless fabric (FIG. 2 and FIG. 3).

Figure 5:
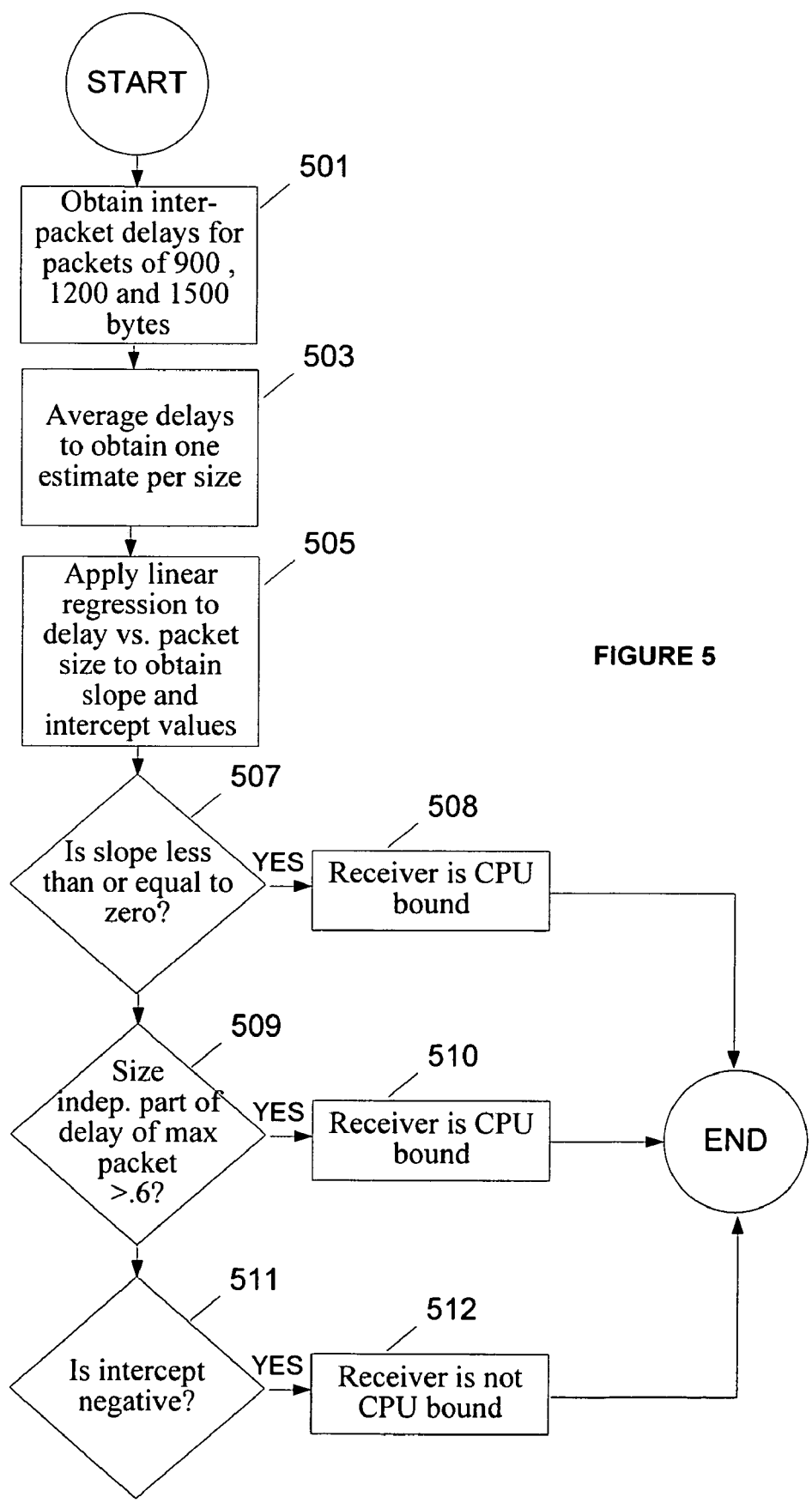
FIG. 5 illustrates a flow chart corresponding to a process for detecting whether a sink is CPU bound according to an embodiment of the invention.

In an embodiment of the invention, this relationship is utilized in order to detect whether a sink is CPU bound. The heuristic according to an embodiment of the invention is illustrated by way of the flow chart of FIG. 5. The process ideally uses trains of 16 packets, although a greater or lesser number may be used depending upon designer preferences, exact network condition, etc. The packet trains smooth out the fluctuations in CPU utilization on the sink and also compensate for cross-traffic. In an embodiment of the invention, trains of significantly different sizes are used. For example, IP datagrams of 900 bytes, 1200 bytes and 1500 bytes are suitable.

Initially, the inter-packet delay is processed to filter out cross-traffic and other fluctuations. If interrupt moderation is detected the train's results are ignored. These initial steps are described later below. The process of obtaining inter-packet delays for packets of 900 bytes, 1200 bytes and 1500 bytes, including the foregoing steps, is executed in step 501 of the flow chart 500. Subsequently at step 503, the delays are averaged to obtain one estimate per size. At this point, a linear regression is applied to this data in step 505, using a line that best fits through the three data points. As will be appreciated by those of skill in the art, given a set of n data points (x, y), a linear regression allows one to find a line that traverses these points while minimizing the sum of the distances between each point and the line. The equation of the line is $f(x)=\beta_0+\beta_1 x$.

Using this line, we apply the following sorting criteria:

(1) If the slope $\beta_1$ is nil or negative in step 507, then there is no logical correlation between packet size and inter-packet delay. This is taken in step 508 to indicate that the sink is CPU bound.

(2) If the share of the receive time of a max MTU packet being received which is independent from the packet's size is more than a certain threshold (e.g., 0.6) in step 509, this is taken in step 510 to indicate that the sink is CPU bound. The share of the receive time that is independent from the packet's size can be calculated as $$\alpha = \frac{\beta_0}{f(\max)} = \frac{\beta_0}{\beta_0 + \beta_1 \cdot \max}.$$

(3) If the intercept $\beta_0$ is negative in step 511, then there was no fixed per-packet overhead. This is taken in step 512 to indicate that the sink is not CPU bound.

In an embodiment of the invention, all consecutive pairs of packets within the train are time stamped. This allows analysis of the network conditions experienced by the train. To minimize the load and complexity of the sink, we send all the results back to the source, although in an alternative embodiment of the invention the sink can perform the packet processing described herein to calculate bottleneck bandwidth.

Figure 6:
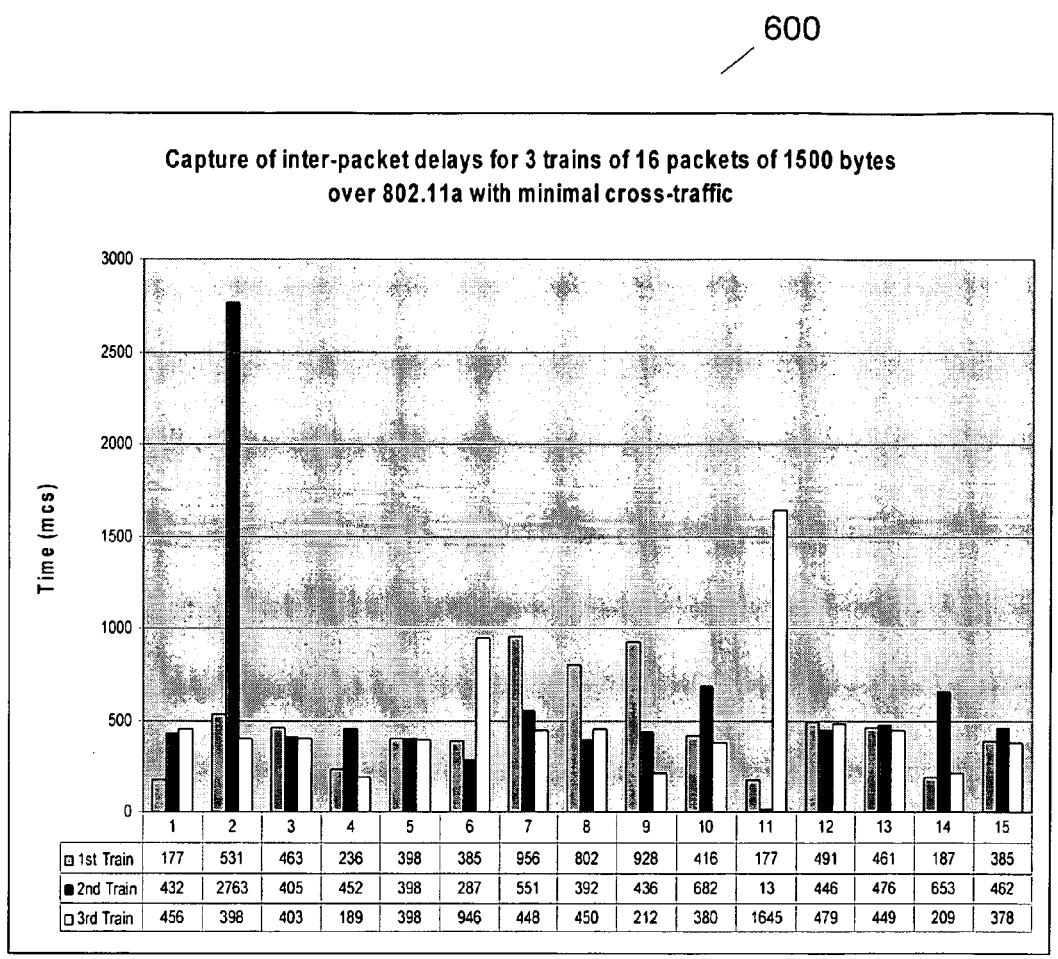

FIG. 6 shows a plot 600 of inter-packet delays for 3 trains of 16 packets of 1500 bytes each sent over 802.11a. There was minimal cross-traffic while the experiments ran. Let $t_i$ be the timestamp for packet $x_i$ received by the sink. Given two such back to back packets, the inter-packet delay is $d_i=t_{i+1}-t_i$. For a train of j packets $(x_i)_{0 \leq i \leq j-1}$, our receiving sink returns the set $(d_i)_{0 \leq i \leq j-1}$ of inter-packet delays. It also returns the advertised speed $B_r$ of the adapter which received the packets. This contrasts with the advertised speed Bs of the adapter sourcing the traffic.

The interpacket delays can be used in an embodiment of the invention to detect massive interrupt moderation. Given B and packets of size s, $m_r=s/B_r$ is the minimum inter-packet delay. Since packets cannot be received faster than $m_r$, the inter-packet delay $d_0$ is bad if $d_0<m_r$. The first of the two packets, $x_0$, must have been delayed by the receiving host before time stamping occurred. The inter-packet delay was thus artificially compressed.

A packet is typically delayed for one of two reasons: (1) the stack does not see the packet until an external event occurs (e.g. a timer fires) or (2) some other higher priority operation is monopolizing the CPU. Interrupt moderation schemes for NICs fall in the first category Bad inter-packet delays resulting from interrupt moderation (IM) are easily spotted as $d<<<m_r$. When host scheduling problems are responsible for compression, $d \approx m_r$. Experiments have shown that approximately 0.9 $m_r$ is a suitable threshold. For example, the first of one or more packets is said to have suffered from interrupt moderation if $d<0.9 \cdot m_r$ for a following inter-packet delay. Moreover, since the delay incurred by IM typically covers multiple packets of a train (if not all), multiple sequential inter-packet delays will be miniscule. Therefore, detecting this problem with a large train is normally easy.

Figure 7:
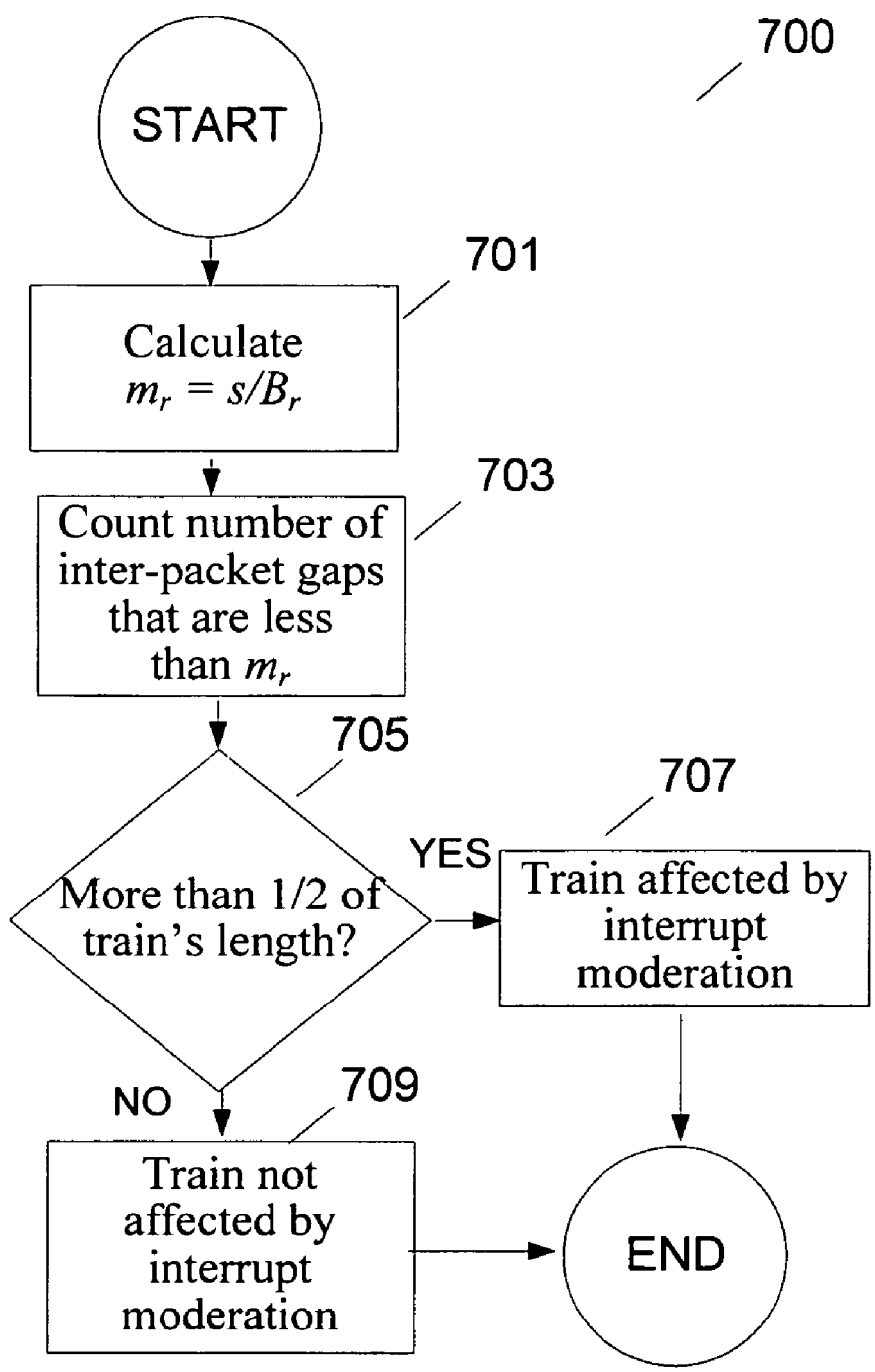
FIG. 7 illustrates a flow chart corresponding to a process for detecting and processing interrupt moderation according to an embodiment of the invention.

Moreover, the interrupt moderation scheme of a NIC is intrinsically tied to its incoming speed. If enough packets were grouped under one interrupt then all these packets must have arrived near line speed. Therefore the bottleneck bandwidth was near line rate. With this understanding, we can detect and process interrupt moderation as shown in the flow chart of FIG. 7. In particular, at step 701 of flow chart 700, $m_r=s/B_r$ is calculated using the speed advertised by the sink. At step 703, the number of inter-packet gaps that are less than $0.9 \cdot m_r$ are counted. At step 705, it is determined whether this number of inter-packet gaps is at least half of the train's length. If it is determined that this number of inter-packet gaps is at least half of the train's length then the process marks the train as affected by interrupt moderation in step 707 and discards it's estimate and estimates the bottleneck bandwidth for the train as the incoming adapter's speed. If at step 705 it is determined that the number of inter-packet gaps that are less than $0.9 \cdot m_r$ is not at least half of the train's length, then the train is marked as not affected by interrupt moderation in step 709.

Figure 8:
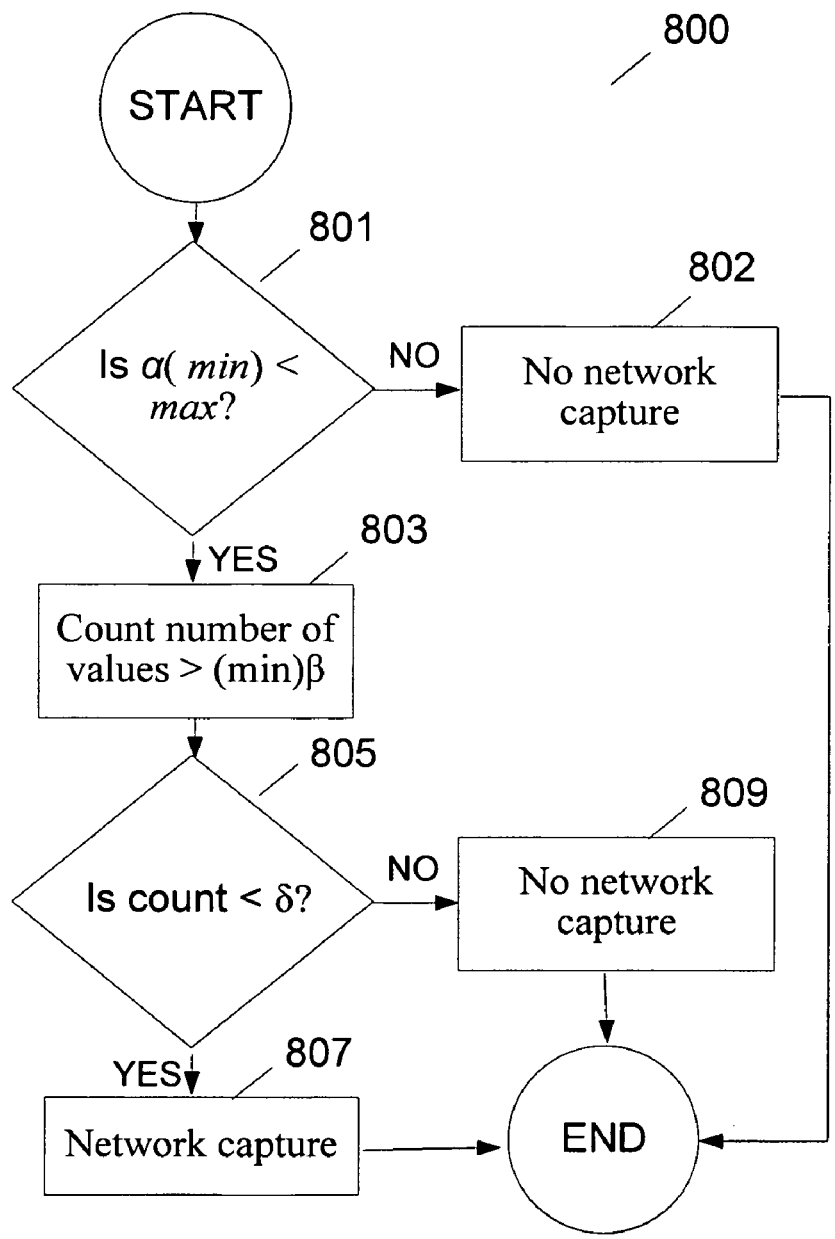
FIG. 8 illustrates a flow chart corresponding to a process for detecting network overload and subsequent network capture according to an embodiment of the invention.

As discussed above, an accurate measurement of bottleneck bandwidth also requires that occurrence of the network capture effect be detected and accounted for. A process for detecting network overload and subsequent network capture is shown in FIG. 8. Given the set of inter-packet delays of a train, let "min" be the smallest measured value bigger than $m_r$. This is the best legitimate measured value. When a train collides with the network capture effect, this value is typically very low. Let "max" be the largest measured value. At step 801 of flow chart 800, it is determined if $\alpha(\text{min})<\text{max}$. If so, network capture may have occurred and the process proceeds to step 803. The value $\alpha$ is a constant defined experimentally.

At step 803, the process confirms network capture by counting the number of values that are $>\text{min}\cdot\beta$, where $\beta$ is another experimental constant. This count is the number of packets that experienced awful conditions given the best value seen. In step 805, if the count is less than $\delta$ of the samples from the train, the process proceeds to step 807 whereat the network is determined to have been overloaded. The bottleneck bandwidth estimate from that train would thus be unrepresentative of the true bottleneck bandwidth, and is discarded. If it is determined in step 805 that the count is $\delta$ or more of the samples from the train, the process proceeds to step 809 whereat the network is determined to not have been overloaded.

Figure 9:
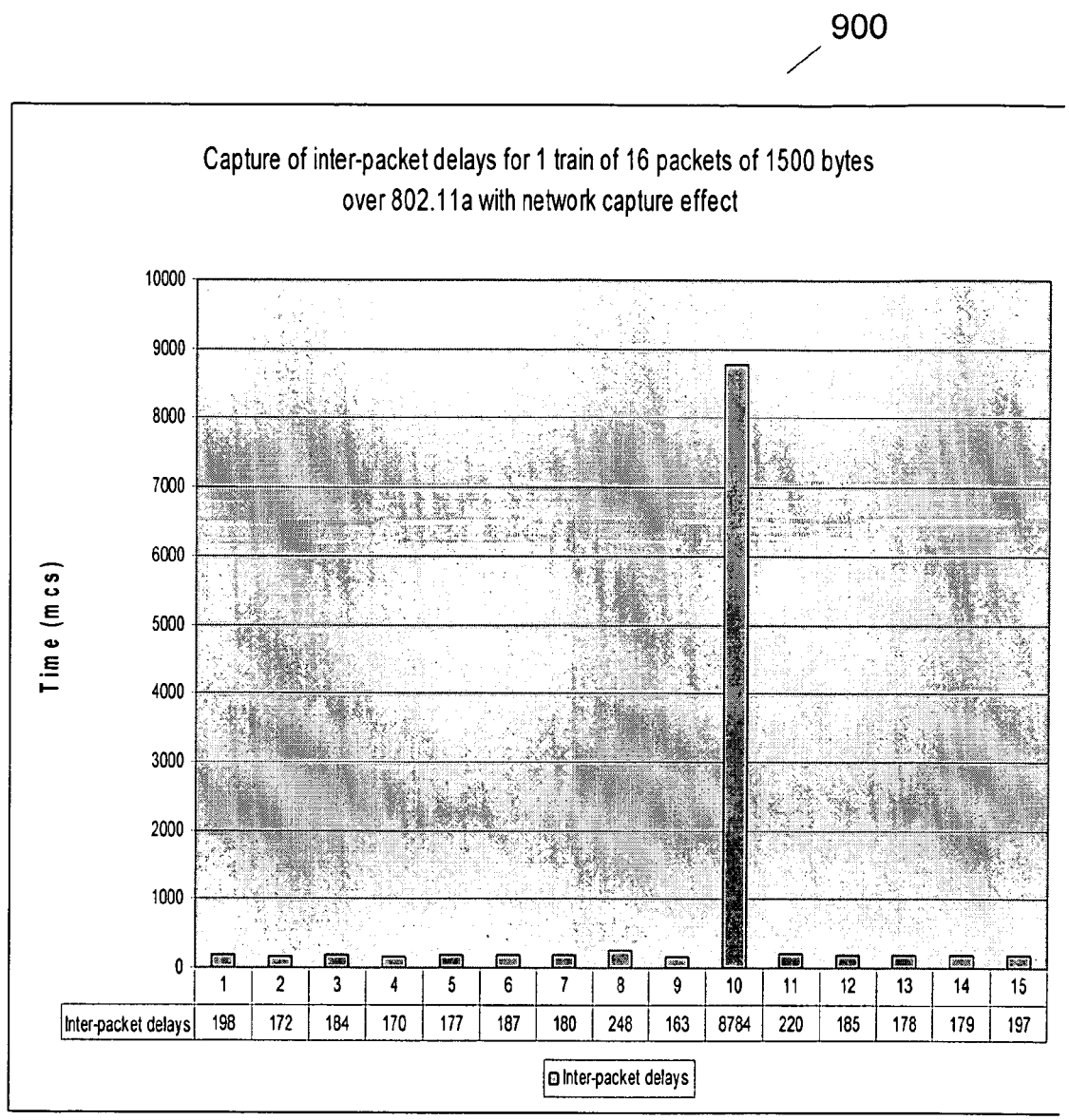
FIG. 9 is a bar graph showing inter-packet delays for one trains of 16 packets of 1500 bytes sent over 802.11a in the presence of the network capture effect.

The data plot 900 of FIG. 9 presents experimental data obtained while running a packet pair experiment with 30 Mb of cross-traffic (sourced from another wireless host) over an 802.11a network. 30 Mb is above the practical throughput of 802.11a which explains the network overload. Experimentally, it has been found that for 802.11, the prevalent wireless fabric for home networks, ideal values for the above heuristic are $\alpha=15$, $\beta=1.25$, $\delta=\frac{1}{4}$.

Thus if the difference between the smallest legitimate delay and the worst delay is not reasonable (e.g. 15 times smaller) but, simultaneously, 3 out of every 4 delays are very close to the smallest delay (e.g. they have almost no variance amongst themselves), then the train was almost certainly impacted by the network capture effect. When this condition is detected, we void the experiment and return an error in that network conditions are beyond analysis at that point in time.

This heuristic is different from only using the variance in delays. For example, the variance would also be high if the delays were split equally amongst small and large values. However the cause in this case would likely be different (e.g. cross-traffic).

We discussed above how to determine whether too many packets had been impacted by interrupt moderation for a train to be usable to analyze the inter-packet delays. Even then, it is still possible that some packets were affected by dilation in the receiving host. Consider the case of a train of 3 packets with inter-packet delays $d_0$ and $d_1$. If the second packet was delayed, either at the receiving stack or by interference on the network, the second inter-packet delay will be compressed while the first will be dilated. In effect, the delay $d_0$ increases while $d_1$ decreases. This can be generalized to any sized train.

In an embodiment of the invention, this tie between dilation and compression is used to filter and balance the inter-packet delays of trains. In particular, the inter-packet delays at the head of the train that are unreasonably smaller than the incoming interface speed, e.g., values that are $<0.9\cdot m_r$, are ignored. These packets were preceded by a delayed packet which is not part of the train. Secondly, starting from the end of the train, we transfer time for values that are $<0.9\cdot m_r$ from preceding values that are $>m_r$. Having eliminated some values and smoothed out the remaining, we recalculate the average avg, min and max delays. If $(\text{min}>0.75\cdot\text{avg})$ and $(\text{max}<1.25\cdot\text{avg})$, then we use avg as the estimate for this train.

If $(\text{min}<0.75\cdot\text{avg})$ or $(\text{max}>1.25\cdot\text{avg})$ then there are still some large outliers in the remaining inter-packet delays of the train. This is usually either due to the remains of dilation in the receiving stack or to cross-traffic. When a collision occurs on the network, a packet can be delayed for a significant period of time. In an embodiment of the invention, the estimate for a train is improved by removing the biggest outliers. In general, between filtering out receiver stack interference and this filtering, a significant number of the inter-packet delays, such as up to ¼, are filtered out. In an embodiment of the invention, the average inter-packet delays of the remaining packets is taken as indicating the best estimate for this bottleneck bandwidth seen by this train.

As noted above, within the 250 ms or other time period allotted to estimate the bottleneck bandwidth, there is enough time to send multiple trains of various lengths and sizes of packets. For example, trains of 16 packets can be sent to detect if the sink is CPU bound, then trains of 12 and 8 packets can be subsequently sent. Having applied the filtering discussed above on the measurements of each train, an estimate of bottleneck bandwidth is made as follows. First, estimates that are above the outgoing interface speed of the source are eliminated. Moreover, if too many trains were lost, the process may return a message indicating that it cannot make an estimate. The making of an estimate until we have enough trains not affected by interrupt moderation. If time runs short, an estimate may be made on data already gathered.

As mentioned in above, numerous bandwidth fluctuations may occur over a wireless fabric during the measurement period. To account for such fluctuations, an improved history window is used in an embodiment of the invention. In an embodiment of the invention, having received the average bottleneck bandwidth results of the packet trains, a best window of 3 consecutive trains whose estimates are within 15% of their average is determined. This window would represent moments in time where the fabric had a stable bottleneck bandwidth. Table 1 shows a table of 9 estimates (all obtained within 250 ms) from trains of various lengths and sizes. The best window is from train 5 to train 7. The bottleneck bandwidth was stable for these 3 trains. The final estimate will thus be ~24 Mbps.

TABLE 1

| Train # | Individual Estimates | Window | Window Estimates |
| --- | --- | --- | --- |
| 1 | 28.3 | N/A | N/A |
| 2 | 26.9 | — | — |
| 3 | 14 | — | — |
| 4 | 18.2 | — | — |
| 5 | 23 | — | — |
| 6 | 24.4 | 2.73 | 24.36667 |
| 7 | 25.7 | 4.06 | 26.06667 |
| 8 | 28.1 | 2.86 | 26.66667 |
| 9 | 26.2 | N/A | N/A |

As mentioned above, the estimates from packet trains are independent of network conditions when the sink is CPU bound. These estimates may still be used by employing the intra-train filtering discussed above. Having determined that a sink is CPU bound, estimates from multiple trains of large packets are averaged. We use multiple trains to filter out fluctuations in the receiving stack. As discussed above, even with a CPU bound receiver, there is still some correlation, however small, between the estimates and the packet size. Since our bottleneck bandwidth estimates is used for A/V experiences over TCP, we use packets of MTU size for the 3 trains since this is likely the packet size TCP will use.

Having discussed the mechanisms underlying bottleneck bandwidth estimation according to various embodiments of the invention, a number of implementation details will now be discussed to aid the reader's understanding.

In an embodiment of the invention, probing packets are sent over UDP. Once the head of a train has been detected, the receiver verifies that there are no re-ordering issues, missing packets or corruption in the header. Every probe received is time stamped using a high accuracy performance counter. The packets preferably have a meaningless payload randomly generated to prevent layer-2 compression and UDP checksum is preferably disabled.

Once all packets of a train are received and processed, the sink sends all inter-packet delays to the source in a reliable fashion (e.g. a pre-established TCP connection) along with basic information about the receiving interface. All of the data processing complexity is preferably kept at the source although such is not required. In this embodiment of the invention, the sink does minimal processing or book keeping.

In an embodiment of the invention a probe packet has at least the information listed in Table 2 below:

TABLE 2

| | |
|---|---|
| First | Indicates the first packet of a packet train. |
| Train size | Number of packets in the train |
| Sequence number | Unique identifier of the packet. Should increase sequentially |

Incoming probe packets from the same source preferably comply with the following rules:

1. The sequence number of a new packet should be that of the previously received packet+1.

2. The First flag should only be used at the beginning of a train.

3. Two trains should not overlap: a train should begin at the minimum at the sequence number of the previous First packet+its advertised train size.

4. All packets of a train should have the same length as the first packet.

5. All packets of a train should have the same train size value.

6. Any packet not determined to be in a train should be discarded and dropped.

7. A discard packet should always have the First flag non set and a train size of 0.

8. The remainder of the packet should be filled with random data.

9. The sink should not access the remainder of the packet.

The First flag is used in an embodiment of the invention to identify the first packet of a train. If this packet is lost, the packets following it are useless and should be discarded. This cannot be expressed without a special tag on the packet. It is preferable for the sink to insure that time stamping is done as quickly as possible. Thus in an embodiment of the invention, the code runs in user-mode and the receiving thread is set to the highest scheduling priority.

A sink accepts a packet train when it accepts all packets starting from a packet with the First flag set, sequence number n and train size s up to the last packet of the train with sequence number n+s. For each train of probes successfully received by the sink, the following information is sent back to the source in an embodiment of the invention:

TABLE 3

| | |
|---|---|
| Sequence number | Unique identifier of the first packet of the accepted train. |
| Interface speed | The interface speed of the receiving interface as of the last packet of the train |
| List of inter-packet delays | Time measured between the each consecutive packet in nanoseconds. |

Preferably the sink does not send summary information back for packet trains that are not successfully receive by the sink. With a wireless adapter, the advertised speed can change over time. The sink may therefore send back the speed of the last packet since it most likely represents the conditions that most packets experienced.

We now summarize the sequence of steps taken by the source in an embodiment of the invention. Since the source may not receive summaries for some of the trains sent and since the source may be unsure of current network conditions including the round trip delay, the source sends trains independently of making estimates.

In an embodiment of the invention, the source sends trains of UDP packets according to the following pattern: (1) including the IP and UDP headers, packets are of size 900, 1200 and 1500 bytes, and (2) excluding 1 discard packet before each train, trains are of lengths 15, 11 and 7 packets. Thus the first train is 16 datagrams of 900 bytes, the second 16 datagrams of 1200 bytes, etc. Trains are initially separated by 20 ms. For each train sent, the source notes the current time before the first packet (the discard packet) is sent. Trains are sent independently of the summary messages received until (1) all have been sent, (2) an estimate is reached or (3) the 250 ms analysis period expires.

With the summary message for each train received by the source, the filtering heuristic described above with respect to intra-train filtering are applied to the inter-packet delays of the train. The current time each summary message is received is also noted. This allows the source to calculate a rough estimate of the round trip time (RTT) for each train. The source preferably keeps a running average across all trains and their estimates which is then used to determine when to send the next train. On a home network, the RTT is typically 1~3 ms. However, on wireless networks, as cross-traffic increases, it can easily be >100 ms. This approach scales the speed of the experiment to the RTT.

Once the source has received results for the first 3 trains of 16 packets, it determines whether the sink is CPU bound as discussed above. If the sink is CPU bound, the source changes the remainder of the experiment to only send trains of 16 packets of 1500 bytes. When a sufficient number of summary messages has been received, the source preferably attempts to make an estimate as described above. Although the source cannot always know the layer-2 header size at the bottleneck link, it preferably assumes that it is at least that of Ethernet.

If after the 250 ms or other predetermined trial time, the source still has not identified a window of stable estimates due to delay fluctuations, the source may eliminate any extreme values from the estimates received using a predetermined threshold of variance, and return an average. In the event that the source simply cannot arrive at an estimate of bottleneck bandwidth for some reason, it may return an error to the caller. This may happen for example when the too many packets have been lost or the RTT is excessive (e.g. >100 ms). Thus, in the worse case, over the course of an exemplary 250 ms probe period, the source will have sent: (1) For a receiver not bound by its CPU, 9 trains for a total of ~129 KB of data, and (2) For a receiver that is CPU bound, 5 trains for a total of ~105 KB of data.

Although the invention may be used in conjunction with networks formed from a wide array of device types possibly but not necessarily including a traditional PC or laptop computer, a description of one type of computer in which various embodiments of the invention may be practiced is now provided. Although not required, the invention will be described in the general context of computer-executable instructions, such as program modules, being executed by a computer. Generally, programs include routines, objects, components, data structures and the like that perform particular tasks or implement particular abstract data types. The term "program" as used herein may connote a single program module or multiple program modules acting in concert. The terms "computer," "computing device," "source," "sender," "sink," "receiver," "recipient" and similar terms as used herein include any device that electronically executes one or more programs, such as personal computers (PCs), hand-held devices, multi-processor systems, microprocessor-based programmable consumer electronics, network PCs, minicomputers, tablet PCs, laptop computers, consumer appliances having a microprocessor or microcontroller, routers, gateways, hubs and the like. The invention may also be employed in distributed computing environments, where tasks are performed by remote processing devices that are linked through a communications network. In a distributed computing environment, programs may be located in both local and remote memory storage devices.

Figure 10:
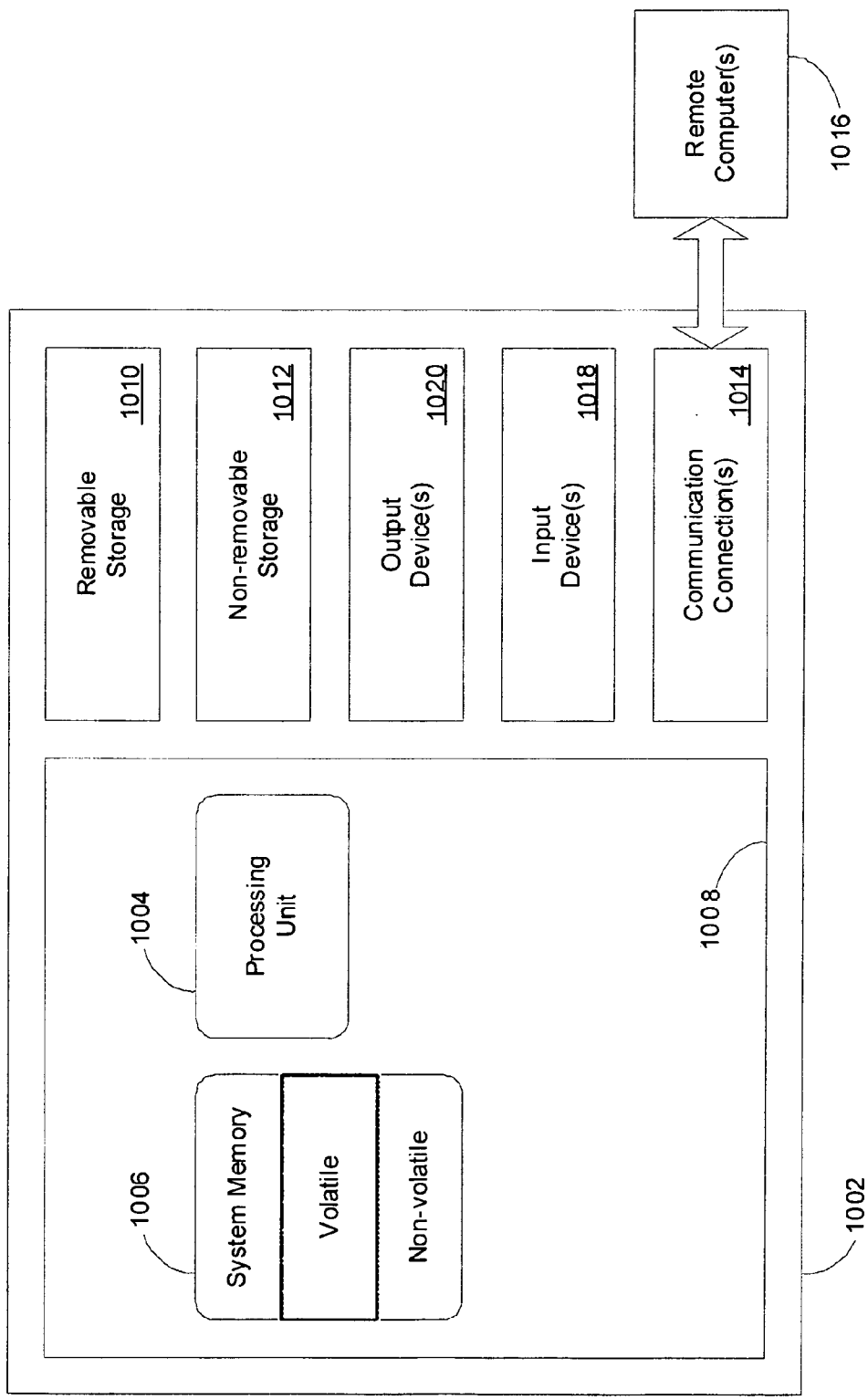
FIG. 10 is a schematic diagram generally illustrating an exemplary computer system usable to implement an embodiment of the invention.

Referring to FIG. 10, an example of a basic configuration for the computer 1002 on which aspects of the invention described herein may be implemented is shown. In its most basic configuration, the computer 1002 typically includes at least one processing unit 1004 and memory 1006. The processing unit 1004 executes instructions to carry out tasks in accordance with various embodiments of the invention. In carrying out such tasks, the processing unit 1004 may transmit electronic signals to other parts of the computer 1002 and to devices outside of the computer 1002 to cause some result. Depending on the exact configuration and type of the computer 1002, the memory 1006 may be volatile (such as RAM), non-volatile (such as ROM or flash memory) or some combination of the two. This most basic configuration is illustrated in FIG. 10 by line 1008.

The computer 1002 may also have additional features/functionality. For example, computer 1002 may also include additional storage (removable 1010 and/or non-removable 1012) including, but not limited to, magnetic or optical disks or tape. Computer storage media includes volatile and non-volatile, removable and non-removable media implemented in any method or technology for storage of information, including computer-executable instructions, data structures, program modules, or other data. Computer storage media includes, but is not limited to, RAM, ROM, EEPROM, flash memory, CD-ROM, digital versatile disk (DVD) or other optical storage, magnetic cassettes, magnetic tape, magnetic disk storage or other magnetic storage devices, or any other medium which can be used to stored the desired information and which can be accessed by the computer 1002. Any such computer storage media may be part of computer 1002.

The computer 1002 also contains communications connections 1014 that allow the device to communicate with other devices such as remote computer(s) 1016. A communication connection is an example of a communication medium. Communication media typically embody computer readable instructions, data structures, program modules or other data in a modulated data signal such as a carrier wave or other transport mechanism and includes any information delivery media. By way of example, and not limitation, the term "communication media" includes wireless media such as acoustic, RF, infrared and other wireless media. RF wireless technologies include WiFi, WiMax, UWB, Bluetooth, 802.11, etc., without limitation. The term "computer-readable medium" as used herein includes both computer storage media and communication media. The term "fabric" used herein refers to the network medium, wired or wireless, and associated components such as routers, switches, repeaters, etc.

The computer 1002 may also have input devices 1018 such as a keyboard/keypad, mouse, pen, voice input device, touch input device, etc. Output devices 1020 such as a display, speakers, a printer, etc. may also be included. All these devices are well known in the art and will not be described at length here.

Figure 11:
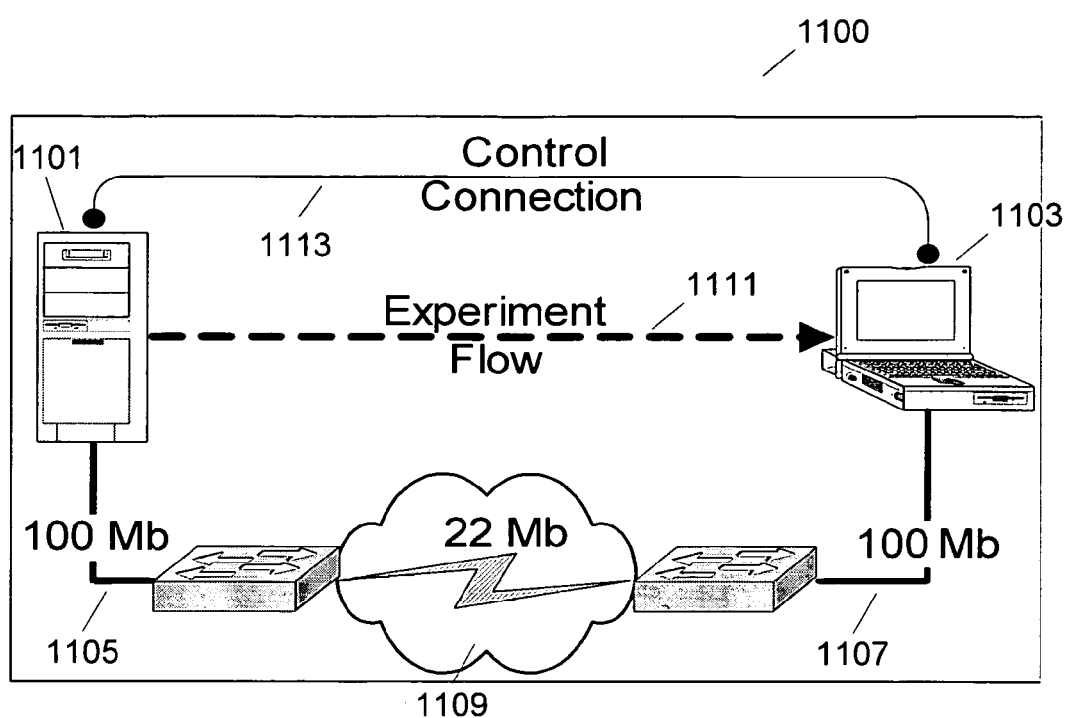
FIG. 11 is a schematic network diagram showing the flow of experimental and control data for determining an estimate for bottleneck bandwidth in a network path.

FIG. 11 is a schematic network diagram illustrating a basic networking environment in which packet train testing according to various embodiments of the invention may be carried out. The environment 1100 includes a sender machine 1101 and a receiver machine 1103, connected by a network including two 100 Mb links 1105, 1107, and one bottleneck 22 Mb link 1109. As can be seen the packets of a train are sent by the sender 1101 over connection 1111 (representing sum of links 1105, 1107, and 1109) and the receiver 1103 sends all inter-packet delays back to the sender 1101 in a reliable fashion such as via a pre-established TCP control connection 1113.

All references, including publications, patent applications, patents and appendices, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Any recitation of ranges of values herein is merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of estimating a bottleneck bandwidth along a path in a computer network between a sender and a recipient, the method comprising:
    transmitting a plurality of packet trains sequentially from the sender to the recipient over the path, wherein each packet train comprises three or more packets;
    determining respective packet delays between respective consecutive packet pairs of at least a portion of the packet trains;
    comparing the respective packet delays for each train to detect whether interrupt moderation or network capture has affected the packet train;
    deriving an estimate of bottleneck bandwidth along the path based on at least a subset of the packet delays of at least one packet train that is not affected by interrupt moderation or network capture; and
    comparing average packet delays for one or more trains to determine whether the recipient is central processing unit (CPU) bound.

2. The method according to claim 1, wherein comparing average packet delays for one or more trains to determine whether the recipient is CPU bound comprises:
    determining an estimated delay between packets within each of three or more trains each having only packets of a single size;
    determining the approximate rate of change of delay between packets as a function of packet size;
    based on the rate of change of delay between packets as a function of packet size, determining whether the recipient of the packets is CPU bound.

3. The method according to claim 2, wherein determining the approximate rate of change of delay between packets as a function of packet size comprises performing a linear regression on the estimated delays between packets within each of the three or more trains, to derive a best fit line of a form $f(x)=\beta_0+\beta_1 x$, wherein the best fit line has slope $\beta_1$ and y-intercept $\beta_0$.

4. The method according to claim 3, wherein determining whether the recipient of the packets is CPU bound based on the rate of change of delay between packets as a function of packet size comprises:
    determining that the recipient is CPU bound if $\beta_1$ is less than or equal to zero; and
    determining that the recipient is not CPU bound if the intercept $\beta_0$ is negative.

5. The method according to claim 4, wherein determining whether the recipient of the packets is CPU bound based on the rate of change of delay between packets as a function of packet size further comprises determining that the recipient is CPU bound if $\alpha$ exceeds a predetermined threshold, where a $\alpha=\beta_0/f(max)$, where $f(max)=\beta_0+(\beta_1 \cdot max)$, and where $f(max)$ is the value of f for a greatest packet size.

6. The method according to claim 1, wherein transmitting a plurality of packet trains sequentially from the sender to the recipient over the path comprises sending a plurality of packet trains of packets of varying size.

7. The method according to claim 6, wherein the packet trains of packets of varying size comprise packet trains wherein all packets within each train are of the same size as all other packets within the same train, and wherein the packet size is selected from three available sizes, and wherein each of the three available packet sizes is represented in one or more trains.

8. The method according to claim 1, wherein determining respective packet delays between respective consecutive packet pairs of at least a portion of the packet trains comprises receiving one or more summary reports indicating a timestamp for each packet.

9. The method of claim 1, wherein determining respective packet delays between respective consecutive packet pairs of at least a portion of the packet trains further comprises selecting a consecutive subset of the packet trains and determining respective packet delays between respective consecutive packet pairs of only the selected packet trains.

10. The method of claim 1, wherein each packet train further comprises a superfluous packet that is dropped and is not used in packet delay calculations.

11. The method of claim 1, wherein comparing the respective packet delays for each train to detect whether interrupt moderation or network capture has affected the packet train comprises:
    counting a number of measured inter-packet gaps that are less than $0.9 \cdot m$, wherein $m_r$ is a smallest possible inter-packet delay;
    determining whether the number is greater than a predetermined portion of the train's length; and
    if it is determined that the number is greater than the predetermined portion of the train's length, then indicating that the train is affected by interrupt moderation, and
    if it is determined that the number is not greater than the predetermined portion of the train's length, then indicating that the train is not affected by interrupt moderation.

12. The method of claim 11, wherein comparing the respective packet delays for each train to detect whether interrupt moderation or network capture has affected the packet train further comprises:
    determining if $min \cdot \alpha < max$ where min is a smallest measured delay value between packets bigger than $m_r$, max is a largest measured value, and $\alpha$ is a constant;
    counting a number of values that are greater than $min \cdot \beta$, if $min \cdot \alpha < max$, where $\beta$ is a constant; and
    determining that the network is overloaded if the count is less than a predetermined number of samples from the train, and
    determining that the network is not overloaded if the count is not less than the predetermined number of samples from the train.

13. A computer storage medium having thereon computer-readable instructions for performing a method of estimating a bottleneck bandwidth along a path in a computer network between a sender and a recipient, the instructions comprising instructions for:
    transmitting a plurality of packet trains sequentially from the sender to the recipient over the path, wherein each packet train comprises three or more packets;
    determining respective packet delays between respective consecutive packet pairs of at least a portion of the packet trains;
    comparing the respective packet delays for each train to detect whether interrupt moderation or network capture has affected the packet train;
    deriving an estimate of bottleneck bandwidth along the path based on at least a subset of the packet delays of at least one packet train that is not affected by interrupt moderation or network capture; and
    comparing average packet delays for one or more trains to determine whether the recipient is central processing unit (CPU) bound.

14. The computer storage medium according to claim 13, wherein the instructions further comprise instructions for:

determining an estimated delay between packets within each of three or more trains each having only packets of a single size;

determining an approximate rate of change of delay between packets as a function of packet size, by performing a linear regression on the estimated delays between packets within each of the three or more trains, to derive a best fit line of a form $f(x)=\beta_0+\beta_1 x$, wherein the best fit line has slope $\beta_1$ and y-intercept $\beta_0$;

determining that the recipient is central processing unit (CPU) bound if $\beta_1$ is less than or equal to zero or if $\alpha$ exceeds a predetermined threshold, where $\alpha=\beta_0/f(max)$, where $f(max)=\beta_0+(\beta_1 \cdot max\ packetsize)$; and determining that the recipient is not CPU bound if the y-intercept $\beta_0$ is negative.

15. The computer storage medium according to claim 13, wherein the instruction for comparing the respective packet delays for each train to detect whether interrupt moderation or network capture has affected the packet train comprises:

counting a number of measured inter-packet gaps that are less than $0.9 \cdot m_r$, wherein $m_r$ is a smallest possible inter-packet delay;

determining whether the number is greater than a predetermined portion of the train's length; and if it is determined that the number is greater than the predetermined portion of the train's length, then indicating that the train is affected by interrupt moderation, and if it is determined that the number is not greater than the predetermined portion of the train's length, then indicating that the train is not affected by interrupt moderation.

16. The computer storage medium according to claim 15, wherein the instruction for comparing the respective packet delays for each train to detect whether interrupt moderation or network capture has affected the packet train further comprises:

determining if $min \cdot \alpha < max$ where min is a smallest measured delay value between packets bigger than $m_r$, max is a largest measured value, and $\alpha$ is a constant;

counting a number of values that are greater than $min \cdot \beta$, if $min \cdot \alpha < max$, where $\beta$ is a constant; and determining that the network is overloaded if the count is less than a predetermined number of samples from the train, and determining that the network is not overloaded if the count is not less than the predetermined number of samples from the train.

17. A method of determining whether a receiver is bound by a central processing unit's (CPU's) processing ability in a computer network environment including a sender machine, a receiver machine, and a network path between the sender and receiver machines, the method comprising:

transmitting a series of packets from the sender to the receiver over the network path to obtain inter-packet delays for packets of three or more different sizes;

average the delays to obtain one delay estimate per packet size;

apply a linear regression to the average delays as a function of packet size to obtain a best fit line of a form $f(x)=\beta_0+\beta_1 x$, wherein the best fit line has slope $\beta_1$ and y-intercept $\beta_0$;

indicating that the receiver is CPU bound if $\beta_1$ is less than or equal to zero, or if a portion of the average delay time of a max maximum transmission unit (MTU) packet which is size independent is more than a predetermined threshold;

indicating that the receiver is not CPU bound if $\beta_0$ is negative.

18. The method according to claim 17, wherein the portion of the average delay time of a max MTU packet which is size independent is $$\alpha = \frac{\beta_0}{f(max)} = \frac{\beta_0}{\beta_0 + \beta_1 \cdot max}.$$

19. A computer storage medium having thereon computer-executable instructions for performing the method of claim 17.

* * * * *